July 16, 1968  S. F. VARIAN  3,392,744
FLUID METHOD AND APPARATUS

Original Filed May 19, 1961  2 Sheets-Sheet 1

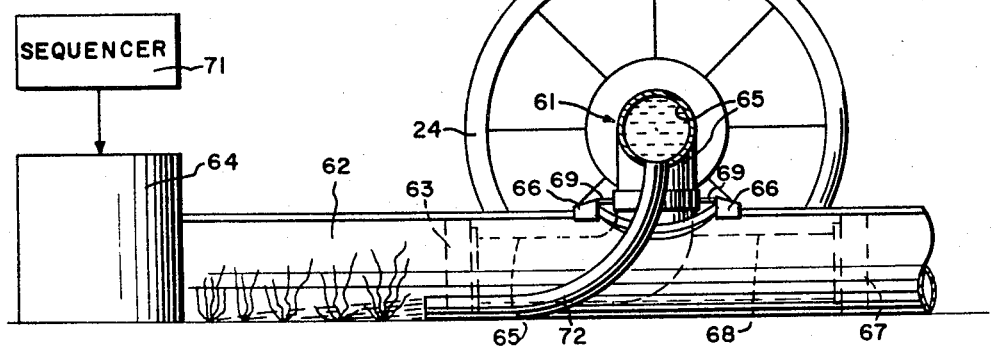
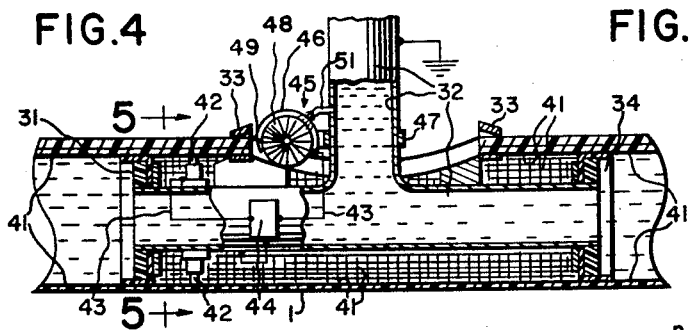
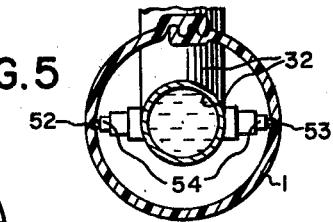
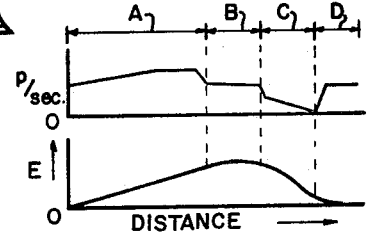
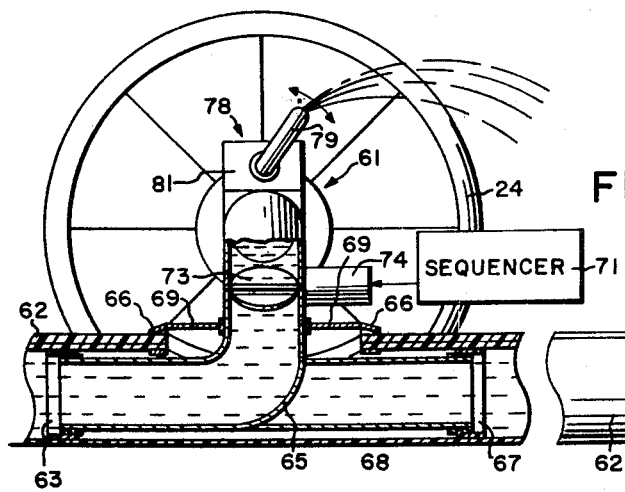

United States Patent Office 3,392,744
Patented July 16, 1968

3,392,744
FLUID METHOD AND APPARATUS
Sigurd F. Varian, deceased, late of Menlo Park, Calif., by Lorna Van Linge, executrix, 130 N. Castanya Way, Menlo Park, Calif. 94025
Original application May 19, 1961, Ser. No. 111,251, now Patent No. 3,170,734, dated Feb. 23, 1965. Divided and this application Feb. 9, 1965, Ser. No. 431,477
6 Claims. (Cl. 137—238)

ABSTRACT OF THE DISCLOSURE

An irrigation system is disclosed employing a zippered tube which is laid out over the terrain to be irrigated. A piston is movable within the tube by fluid pressure applied thereto and includes a zipper fastener affixed thereto for opening and closing a hole in the zippered tubing through which fluid for irrigation may pass.

Figure 1:
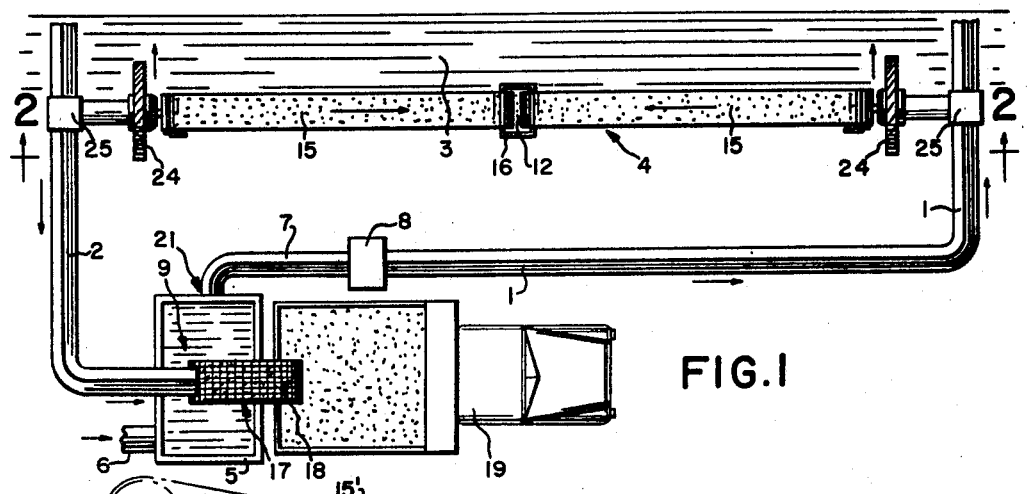

The fluid pressure applied to the piston is pulsed at a varying rate depending upon the nature of the terrain over which the tube extends to obtain a controlled movement of the piston in rolling terrain and to vary the rate of which irrigation fluid is dispensed according to soil conditions.

In one embodiment, the pressure is pulsed by periodically increasing the pressure applied to the piston; in another embodiment the pressure is pulsed by periodically throttling the fluid passing through the piston; in still another embodiment, the piston is pulsed by periodically releasing the fluid on the downstream side of the piston.

---

The present invention is a divisional application divided out of copending application Ser. No. 111,251, filed May 19, 1961 and now issued as U.S. 3,170,734 on Feb. 23, 1965 and relates in general to fluid method and apparatus and more specifically to method and apparatus for distributing fluid and/or for performing hydraulically assisted operations at remote locations disposed along or between predetermined paths defined by one or more zippered fluid carrying tubes. Such method and apparatus is especially useful for distributing water for irrigation of crops, and/or for performing other work functions such as, for example, transport of harvested crops back to a central packing location.

In my earlier filed copending application entitled, "Fluid Method and Apparatus," U.S. Ser. No. 116,212 filed Mar. 31, 1961, now issued as U.S. Patent 3,217,725, there is shown fluid circuit apparatus including one or more parallel-directed spaced zippered tubes, each of said tubes having a pair of spaced-apart zipper fasteners defining a movable opening. In one embodiment, spaced tubes are interconnected via a fluid utilization circuit communicating with the zippered tubes through the movable openings and traveling longitudinally of the spaced tubes for performing irrigation of crops or for performing other work functions such as, for example, harvesting, seeding and the like.

Motive force for propelling the fluid utilization circuit lengthwise of the zippered tubes was derived from the working fluid. In one embodiment, the fluid utilization circuit was propelled by pistons disposed in the zippered tubes, the pistons being physically connected to the fluid utilization circuit and the force exerted by the fluid on the pistons serving to propel the utilization circuit longitudinally of the tubes. The fluid utilization circuit was provided with wheels and was relatively lightweight. One advantage of this arrangement is that it may be utilized on cultivated land which need not be flat since the zippered tubes permit the water to be pumped over rolling terrain and to likewise propel the water utilization circuit over relatively uneven land.

One disadvantage of using a piston for propelling the water utilization circuit is that the force exerted on the piston is relatively uniform whereas the force required to propel the utilization circuit and piston at a certain constant speed depends upon whether the utilization circuit is going uphill or downhill and the force available at the piston is a function of the elevation of the piston relative to the pump. Consequently, in rolling terrain, the utilization circuit would move slowly uphill but move relatively rapidly downhill. For many applications it would be desirable to have the fluid utilization circuit move at a constant speed or be programmed at a controlled predetermined speed in accordance with soil conditions such as porosity, moisture content and the like.

The piston propulsion problem, mentioned above, was partially overcome by another embodiment of the aforementioned invention wherein the working fluid was used to drive a turbine, the turbine then through a suitable mechanical gear train and wheel serving to provide the propelling force. While such an arrangement is adequate for many installations, it is desirable to have a propelling means that is independent of the flow of fluid through the utilization circuit.

It has been found that foreign matter tends to find its way into the mating zipper track and prevent formation of a strong fluid tight seal at the fastened zipper track. Accordingly, it is desirable to provide means for cleaning the zipper track before the tracks are fastened.

The aforementioned application described an embodiment which included the provision of a spray pipe in the fluid utilization circuit. The spray pipe served to irrigate by spraying water from the water utilization circuit onto crops disposed substantially imemdiately below the utilization circuit. While a spray is suitable for irrigation in many instances, for certain crops, it is desirable to irrigate in a manner which does not cause foliage of the plants to become wet.

Furthermore, this aforementioned spraying device was shown to spray water substantially only directly below the fluid utilization circuit. While such a method of irrigation is suitable in many instances, there are certain other instances of soil condition in which it is desirable to increase the time of application of water to the soil to improve absorption of the irrigation water.

Heretofore harvesting of certain crops has created certain problems. For example, in truck farming of, for example, lettuce and berries, the crop is typically harvested and boxed in the field. The boxes are stacked in suitable locations accessible by roads into the fields such that heavy equipment such as, for example, trucks may be moved into the field. Such heavy vehicular traffic, in addition to requiring loss of valuable field space for access roads, causes the soil to be compacted by the heavy equipment. The compact soil is difficult to break when the field is cultivated, at a later date. In addition, harvesting time is limited to times during which weather permits access over the roads into the field. Therefore, it is desirable to provide a harvesting method and apparatus which reduces the weight of equipment that must move into a field for harvesting.

The principal object of the present invention is the provision of fluid method and apparatus utilizing one or more zippered tubes for distributing fluid and/or performing other work functions at remote locations from a source of fluid, said fluid apparatus serving to eliminate or alleviate the problems and disadvantages of previous agricultural method and apparatus as indicated above.

One feature of the present invention is the provision of method and apparatus for transporting harvested crops from a remote location of a field to a central packing or collection point by working the harvested crop into a zippered tube and pumping the crop back to a central packing or collection point remote from the harvesting point.

Another feature of the present invention is the provision of method and apparatus for pulsing the movement of a piston, operable within a zippered tube, in time sequenced repetition in order to cause the piston to move longitudinally within the tube.

Another feature of the present invention is the same as the preceding feature and, in addition, including means for programing the pulsed movement of the piston.

Another feature of the present invention is the same as the second feature wherein a valve is connected to and travels with said piston and is placed in fluid series communication with the flow of fluid through the piston, the valve being variably opened or closed in a time sequenced manner to produce the pulsed movement of the piston.

Another feature of the present invention is the same as the second feature and, in addition, including a valve disposed on the downstream side of said piston and in fluid communication with the downstream side of said piston within the zippered tube, the valve being opened or closed in a time sequenced manner to pulse the back pressure on said piston and thereby produce the pulsed movement of the piston.

Another feature of the present invention is the provision of means for cleaning foreign matter from the zipper track before mating of the zipper track segments to enhance formation of a strong fluid tight seam.

Another feature of the present invention is the provision of a plurality of dragging hoses communicating with a moving water utilization circuit disposed between spaced apart zippered tubes for irrigating crops without unduly wetting the crop foliage.

Another feature of the present invention is the provision of one or more electrical conductors, carried by the zippered tube, for supplying electrical energy to a fluid utilization circuit communicating with the zippered tubes.

Another feature of the present invention is the provision of method and apparatus for spraying water from a movable water utilization circuit interconnecting spaced-displaced zippered tubes, the sprayer serving to dispense water over a substantial distance ahead of and/or behind the utilization circuit to allow for enhanced absorption of the applied irrigation water.

Figure 2:
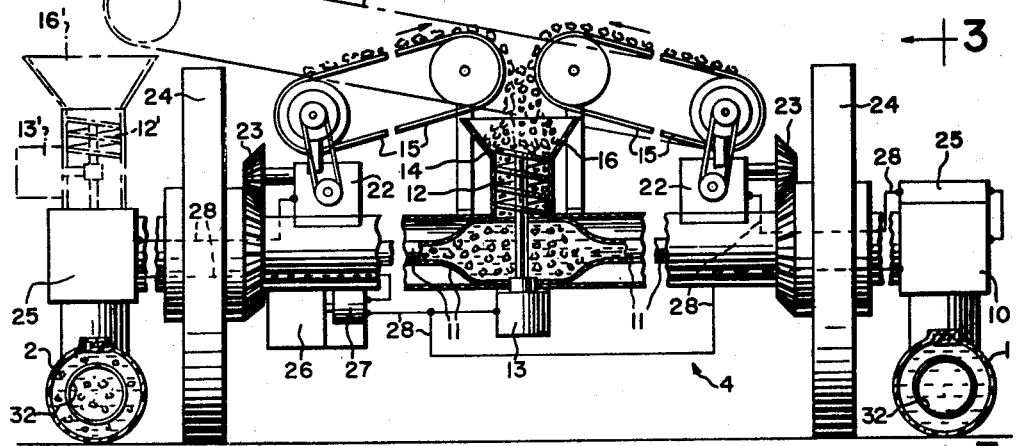
Figure 3:
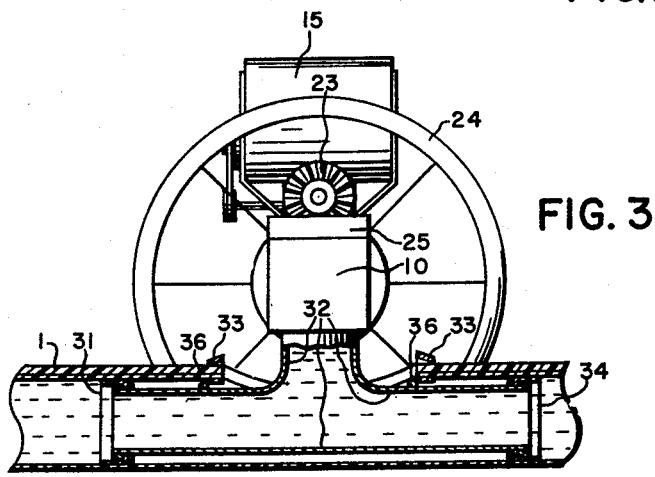

Other features and advantages of the present invention will become apparent upon a perusal of the specification taken in connection with the accompanying drawings wherein:

FIG. 1 is a plan view of one embodiment of the present invention,

FIG. 2 is an enlarged foreshortened view, partly in section, and partly schematic of a portion of the structure of FIG. 1 taken along line 2—2 in the direction of the arrows, FIG. 3 is a cross-sectional view of a portion of the structure of FIG. 2 taken along line 3—3 in the direction of the arrows, FIG. 4 is a fragmentary longitudinal cross-sectional view of an alternative embodiment of the present invention, FIG. 5 is a transverse cross-sectional view of an alternative portion of the structure of FIG. 4 delineated by line 5—5, FIG. 6 is a side elevational view, partly in cross section, and partly schematic of an alternative embodiment of the present invention, FIG. 7 is a coordinated diagram of piston drive pulses per second and terrain elevation as a function of distance to depict typical operation of the apparatus of FIGS. 6 and 8, and FIG. 8 is a side elevational view, partly in section, and partly schematic of an alternative embodiment of the present invention.

Referring now to FIGS. 1 through 3 there is shown a harvesting apparatus utilizing features of the present invention. More particularly, longitudinally directed parallel spaced-apart zippered tubes 1 and 2 are laid out across the field 3 which it is desired to harvest.

A fluid utilization circuit 4 interconnects the spaced tubes 1 and 2 providing a fluid path from one of the tubes to the other, say, for example, from tube 1 to tube 2.

Fluid is supplied to the spaced tubes 1 and 2 from a reservoir 5 connected to a suitable source of water such as, for example, a water main 6. Fluid is drawn from the reservoir 5 via pipe 7 and applied to the input or suction intake of a pump 8, the output of the pump 8 is connected to one of the zippered tubes 1. The other zippered tube 2 empties back into the reservoir 5 at 9.

The fluid utilization circuit 4 is shown in greater detail in FIG. 2 and includes a main section of pipe 11 which is preferably made of relatively rigid lightweight wall material as of, for example, plastic or aluminum. In a preferred embodiment of this invention, the pipe 11 is made as small in diameter as practicable considering pressure available for portions of the interconnecting water utilization circuit 4 for minimizing the weight of water carried by the water utilization circuit 4. In a preferred embodiment, a pump 10, at the input end of the utilization circuit 4, increases the pressure and thus the velocity of the fluid stream through the pipe 11 of the utilization circuit 4. However, certain portions of the pipe 11 should be of sufficient diameter to pass material pumped therethrough without clogging, as further described below.

An auger 12 or other suitable pump communicates through the side wall of pipe 11 and is driven by a motor 13. In use, the motor 13 is set to drive the auger 12 at sufficient angular velocity to prevent the escape of fluid, typically water, outwardly of the pipe 11 through the auger 12. Crops which are harvested by suitable apparatus, not shown, are transported to the input end 14 of the auger 12 by any suitable means as of, for example, conveyor belts 15. Entrance of the crop into the input end 14 of the auger 12 is assisted by the provision of a hopper 16.

The harvested crop is augered or worked into the main stream of fluid passing through the fluid utilization circuit 4 and is transported by the fluid stream to the zippered tube 2 and thence to reservoir 5 at 9 through separator 17. The separator 17 includes a continuous moving screen 18 as, for example, a perforated conveyor belt which screens the crop from the returning flow of fluid and deposits the separated crop into a suitable receptacle as, for example, a truck 19. The water or other working fluid is then drawn from the reservoir 5 at 21 via pipe 7 and recirculated through the system by the pump 8. Additional makeup water, as required, is valved into the reservoir 5 from the water main 6.

For crops consisting of relatively large items such as cabbage or celery, the crop is preferably augered into the fluid stream at the output end of the fluid utilization circuit 4 as shown in phantom lines of FIG. 2. In this case, the conveyor 15' directs the harvested crop to the output end of the utilization circuit 4 and the auger 12' works the crop directly into a pipe 32.

The propelling force for driving the fluid utilization circuit over the field to be harvested may be had in a number of ways. In a preferred embodiment, electric motors 22, through a suitable gear train 23, drive relatively large diameter lightweight wheels 24 carried from the water utilization circuit 4. Motors 22 also serve to drive conveyor belts 15.

Angular sensing devices 25 as of, for example, selsyns interconnect the utilization circuit 4 and the zippered tubes 1 and 2 and are electrically connected in circuit with the motors 22 to control drive wheels 24 to maintain a desired angular relationship between the longitudinal axis of the fluid utilization circuit 4 and the longitudinal axes of the spaced zippered tubes 1 and 2, respectively. In a preferred embodiment, this angular relationship is perpendicular.

Electrical power for driving motors 13, 13', 22, selsyns 25 and pump 10 is supplied by a suitable engine generator unit including engine 26 and generator 27 carried from the utilization circuit 4. Conductors 28 supply the electrical power from the generator to the electric power consuming elements 13, 13', 22, 25 and 10, respectively.

Fluid communication through the side walls of the zippered tubes 1 and 2 is obtained through the provision of movable openings in the zippered tubes 1 and 2 in a manner described in detail in my co-pending application referred to above. Briefly, this apparatus includes a centrally apertured low friction piston 31 (see FIG. 3) sealed in fluid tight relationship within the interior of the zippered tubes 1 and 2. A fluid passageway, formed by pipe 32, communicates with the central opening in the piston 31 and includes a portion extending longitudinally of the zippered tube 1 and a vertically directed portion which emerges from the tube 1 through a movable opening. The movable opening in the zippered tube 1 is defined between two movable zipper fasteners 33 which are caused to move in concert with the piston 31.

A stabilizing piston 34 is carried within the zippered tube 1 downstream of piston 31 and is interconnected to piston 31 via the intermediary of the pipe 32. The zippers 33 are caused to move in concert with the pistons 31 and 34 via a suitable mechanical linkage 36 interconnecting the zipper fasteners 33 and the pipe 32. Fluid supplied to the input end of zippered tube 1 is caused to pass through the central opening in piston 31 and thence via pipe 32 and pump 10 into the fluid utilization circuit 4.

Referring now to FIG. 4 there is shown an alternative apparatus to that of FIG. 3 wherein electrical power is supplied to the fluid utilization circuit 4 via an alternative method and apparatus as compared to the engine generator 26-27 of FIGS. 1 and 2. More specifically, electrical power is supplied to the fluid utilization circuit 4 via the intermediary of one or more conductors carried from and preferably embedded in the zippered tubes 1 and/or 2.

In the embodiment of FIG. 4 there is shown a one wire conductor embodiment wherein electrical power is applied to the fluid utilization circuit 4 via the intermediary of a wire mesh 41. The wire mesh 41 as of, for example, copper, is carried from the inside surface of the zippered tube 1. The zippered tube 1 serves as an insulator between the conductor 41 and the earth which serves as the return wire thereby completing the electrical circuit between a generator, not shown, such as, for example, a 400 cycle A.C. generator and the motors of the fluid utilization circuit 4. The generator would generally be disposed at the location of the pump 8.

The A.C. power at, for example, 400 cycles per second and several hundred volts is picked off the conductor 41 via suitable contacts such as, for example, one or more carbon brush assemblies 42 carried preferably on the dry downstream side of the piston 31. The brushes 42 are connected by a suitable insulated conductor 43 to electrical power utilization devices such as motors 13, and 22 of FIGS. 1-3 and thence to ground via, for example, electrical connecting wheels 24.

A voltage step down transformer 44 is preferably placed in circuit with conductor 43 for stepping down the relatively high voltage carried by conductor 41 to a relatively safe low voltage such as, for example, 12 volts. In this way, workmen and other personnel working around the harvesting or fluid utilization circuit cannot be seriously injured when coming in contact with the output voltage of transformer 44 as applied to motors 13, and 22.

Another feature of the embodiment of FIG. 4 is the provision of a motor driven cleaning brush assembly 45 for cleaning dirt, rocks, and other foreign matter from the zipper track before the zipper track is fastened by fasteners 33. More specifically, the cleaning brush assembly 45 includes a motor 46 supported from the vertically directed portion of pipe 32 via a suitable bracket 47. A rotatable cylindrical bristled brush 48 is driven by the motor 46. The rotating brush 48 bears at 49 against the mating-track portions of the zipper track for cleaning the track before the mating portions thereof are pressed together by zipper fastener 33. In this manner, a clean zipper track is assured to minimize the possibility that the zipper will be inadvertently parted due to failure to make a proper mating between the two lip portions of the zipper.

A nozzle 51 is provided in fluid communication with the pipe 32 and serves to spray fluid onto the rotating brush and zipper track to assist in the cleaning action of the brush 48. Electrical power for driving the cleaning brush 48 is supplied from the output terminal of transformer 44 via conductor 43.

Referring now to FIG. 5 there is shown an alternative embodiment of the structure of FIG. 4 wherein electrical power is supplied to the fluid utilization circuit 4 via a two-wire system. More specifically, first and second wires 52 and 53, respectively, are embedded in the zippered tube 1, each wire having a bare portion exposed at the inside surface of the tube 1. Suitable brush assemblies 54 are carried from the pipe 32 and make electrical contact with the wires 52 and 53. The brushes 54 are preferably connected to the primary of a step-down transformer.

One of the wires 52 carries electrical current to the fluid utilization circuit while the other conductor 53 forms the return wire such that return of electrical current need not be made back through the earth. The above two-wire system has advantage where soil conditions are not sufficiently conductive to form a good ground return.

Referring now to FIG. 6 there is shown another embodiment of the present invention. In this embodiment, a fluid utilization circuit 61 is propelled lengthwise of a zippered tube 62 by the force applied to a piston 63 due to the pressure of fluid on the upstream side of the piston 63 supplied from a suitable source of fluid such as, for example, a pump 64.

The piston 63 is centrally apertured and communicates with a pipe 65 having an outwardly and upwardly directed portion extending through a movable opening in the zippered tube 62 defined between two movable zipper fasteners 66.

A stabilizing piston 67 is disposed downstream of the first piston 63 and is rigidly connected to the pipe 65 via tubular member 68. Zippers 66 are driven longitudinally of the zippered tube 62 via rigid arms 69 attached to the pipe 65.

It has been found that, when a fluid utilization circuit such as 61 is piston propelled over uneven terrain such as indicated by E for elevation in FIG. 7, the piston driving pressure is an inverse function of the back pressure or head developed as the fluid is pumped uphill and conversely is aided by the regained or developed head as the utilization circuit is propelled downhill as, for example, in the region C. In addition, the force exerted by the weight of the utilization circuit 61 tends to apply a back pressure in uphill regions as in region A whereas in downhill region C the utilization circuit exerts an additive force further providing for an increase in effective pressure head. The result is that the utilization circuit travels over the terrain at varied speeds depending upon whether the utilization circuit is being propelled uphill or downhill.

To overcome these variations in speed of the utilization circuit, there is provided a sequencer 71 which causes the pump pressure to be repetitiously pulsed upwards in pressure, over the steady state pressure value. The pulse rate is determined in accordance with the slope and relative elevation of the terrain with respect to the pump (see P/sec. as a function of E and distance in FIG. 7). The pulses of pressure are transmitted to the piston 63 causing the piston to be propelled forward during the pulse. The program for the sequencer 71 may be computed ahead of time or may be arrived at empirically, as desired. The program can also be varied to take into consideration various soil conditions over the path traversed by the utilization circuit 61. For example, the pulse rate fed from the sequencer to the pump may be increased in regions of relatively moistened soil and the pulse rate slowed in regions which are relatively dry.

Another feature of the fluid utilization circuit 61 of FIG. 6 is the provision of a plurality of dragging tubes 72 placed in fluid communication with the transversely directed segment of pipe 65. The dragging tubes 72 serve to apply water from the fluid utilization circuit 61 to the ground in a manner such as not to cause undue moistening of the foliage of the crops. In a typical installation, the dragging hoses 72 are relatively closely spaced, as in the order of 10 inches, longitudinally of the transversely directed pipe 65 in order to provide application of water to the crops at closely spaced intervals approximating the distance between crop rows.

Referring now to FIG. 8 there is shown an alternative embodiment for sequencing pulsed movement of the fluid utilization circuit of FIG. 6. In this embodiment the pressure pulses are applied to the piston 63 by means other than sequencing the pressure of the pump, not shown. Instead, the sequencer 71 repetitively throttles a valve 73 in pipe 65 via motor 74 to increase or decrease the effective area of the piston 63 and thereby divert more or less of the available fluid pressure for propelling the fluid utilization circuit 61.

Here again, the program for the sequencer 71 may be arrived at empirically or precalculated or made responsive to some other sensing and control apparatus. The program may be transmitted to the sequencer 71 from a radio transmitter disposed at a remote location or from a sound transmitter disposed at a remote location and sending the sound signals over suitable transmission paths such as, for example, the fluid within the tube 62. Still another method for transmitting the program to the sequencer 71 would be by additives to the fluid supplied via zippered tube 62, the additive serving to repetitively change some property of the fluid stream. The changing property is picked up by a suitable sensing element, not shown, and serves to activate the sequencer 71. The properties of the fluid stream that can be altered for activation of the sequencer 71 include, the conductive properties, radioactive properties, and density properties as by air bubbles.

As an alternative to the use in pipe 65 of sequencer 71, motor 74 and valve 73 for deriving impulses applied to piston 63, these elements may be utilized at the far end of the zippered tube 62 at 75 for selectively controlling the back pressure applied to piston 63. The latter arrangement is suitable for use when the zippered tube 62 is filled with fluid on the downstream side of piston 67. The fluid column thus produced serves to provide back pressure for piston 63, the amount of back pressure is controllable by valve 73'. Again, sequencer 71' may be programmed in any desired manner as indicated above especially with regard to FIG. 7.

Another feature of the apparatus of FIG. 8 is the provision of a sprinkler mechanism 78 for spraying irrigation water ahead as of, for example, 30 feet of the fluid utilization circuit 61 and/or an equal distance behind the utilization circuit 61 such as to cover a relatively large area of application. In this manner, water may be applied to the soil over a relatively long period of time to permit full absorption of the applied water and minimize undesired run-off. In a preferred embodiment of this feature, the sprinkler 78 includes a perforated spray pipe 79 in fluid communication with pipe 65 and reciprocally driven in a sector of arc about the transversely directed portion of pipe 65 interconnecting the two spaced zippered tubes. A gear box 81, deriving its power from the flow of fluid through the sprinkler 78, drives the spray pipe 79 in the conventional manner.

In certain pronounced rolling terrain the zippered tubes 1 and 2 may be subjected to substantial fluid pressures for pushing the piston 63 and associated utilization circuits 61 or fluid junction over the hills. Accordingly, it is desirable that the walls of the tubing 1 and 2 be as strong as possible. Therefore, high energy electron irradiated plastics and/or fiber reinforced plastics as of cotton, glass or nylon may be used advantageously. Also weathering of the tubes due to ultra-violet radiation, moisture and the like should be minimized as by coating on or embedding in the plastic tube a radiation reflective material such as a thin aluminum layer or aggregate. Also it is desirable to press the mating zipper tracks together by passing them through rollers as opposed to the more conventional sliding press.

Since many changes could be made in the above construction and many apparently widely different embodiments of this invention could be made without departing from the scope thereof it is intended that all matter contained in the above description or shown in the accompanying drawings shall be interpreted as illustrative and not in a limiting sense. For example, the conveyor belts 15 of FIGS. 1–3, for the sake of clarity of explanation, are shown disposed directly above the transversely directed pipe 11. In practice, the conveyor belts 15 and auger 12 may be disposed at any suitable location and orientation with respect to pipe 11 as, for example, in a horizontal plane ahead of the pipe 11.

What is claimed is:

1. In a fluid apparatus, a zippered tube having mating zipper track portions and defining a fluid path therewithin when fastened, a zipper fastener movable along said zippered tube to define one end of a movable opening in said zippered tube, means movable in concert with said movable fastener for washing the zipper track portion of foreign matter before fastening of the zippered tube by said movable fastener.

2. In a fluid apparatus, an extensible zippered tube overlaying a section of terrain, a piston movable within said zippered tube by application of a fluid pressure differential across said piston, means for repetitively pulsing the fluid pressure differential across said piston within said zippered tube to produce pulsed movement of said piston, means for changing the pulse rate of said pulsing means in accordance with changes in the terrain over which said tube extends.

3. Apparatus according to claim 2 wherein said pulse rate changing means pre-programs the pulse rate applied to said piston to cause said piston to move in variable accordance with conditions of the soil over which said piston is movable.

4. The apparatus according to claim 2 wherein said means for pulsing the pressure differential across said piston includes means for periodically increasing the pressure of fluid supplied to the upstream side of said piston.

5. The apparatus according to claim 2 wherein said means for pulsing the pressure differential across said piston includes means movable with said piston for periodically throttling the fluid passing through said piston and to periodically vary the effective working area of said piston.

6. The apparatus according to claim 2 wherein said means for pulsing the pressure differential across said piston comprises means for periodically throttling the release of fluid from said zippered tube on the downstream side of said piston.

References Cited

UNITED STATES PATENTS

| 3,011,502 | 12/1961 | Jordan | 139—580 |
| 3,019,813 | 2/1962 | Dommann | 137—580 |
| 3,217,725 | 11/1965 | Varian | 302—14 |

M. CARY NELSON, *Primary Examiner.*

W. CLINE, *Assistant Examiner.*